Figure 1:
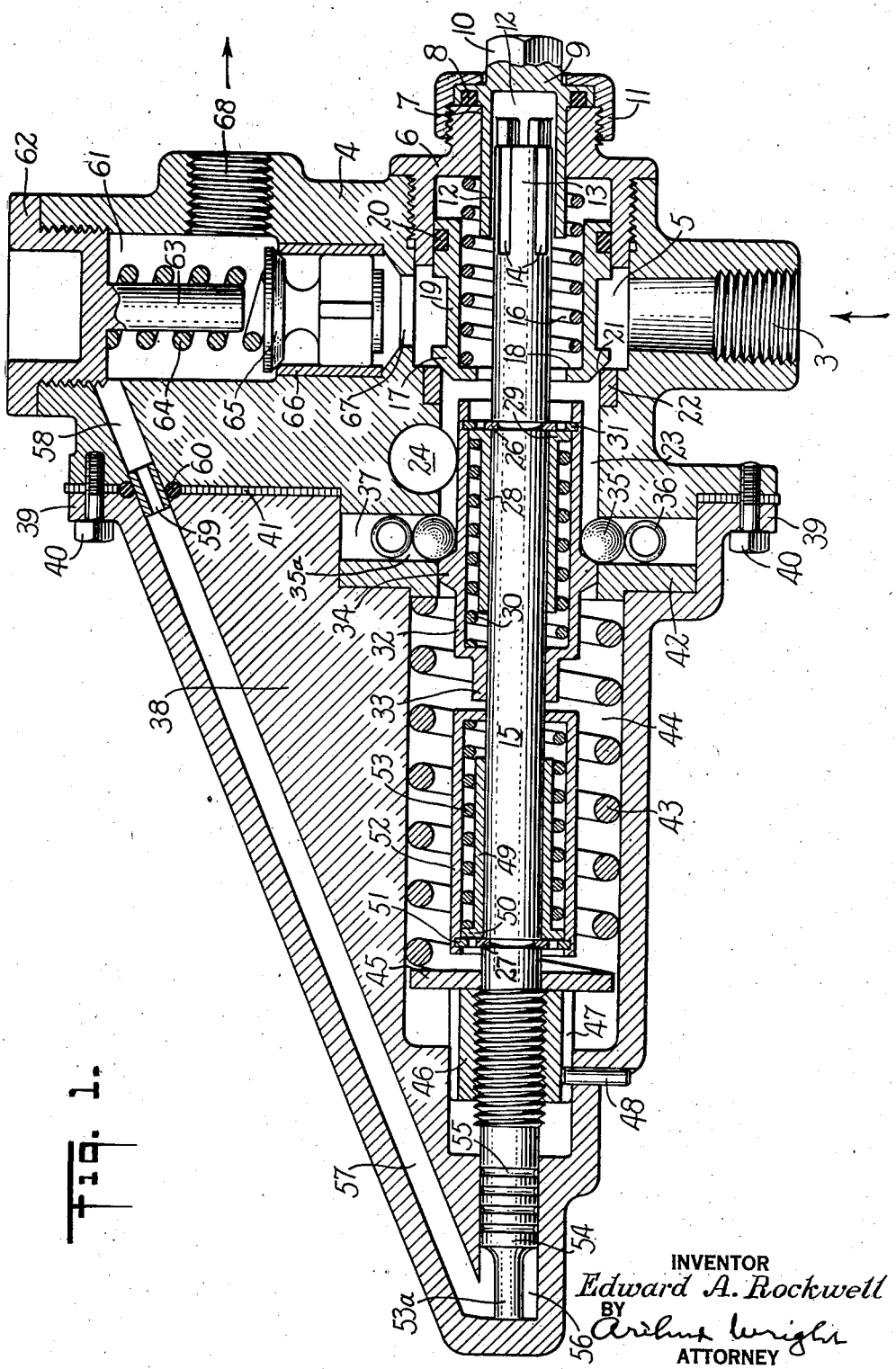

March 20, 1945.  E. A. ROCKWELL  2,372,016

UNLOADER VALVE

Filed Sept. 19, 1942  2 Sheets-Sheet 1

INVENTOR
Edward A. Rockwell
BY
Arthur Wright
ATTORNEY

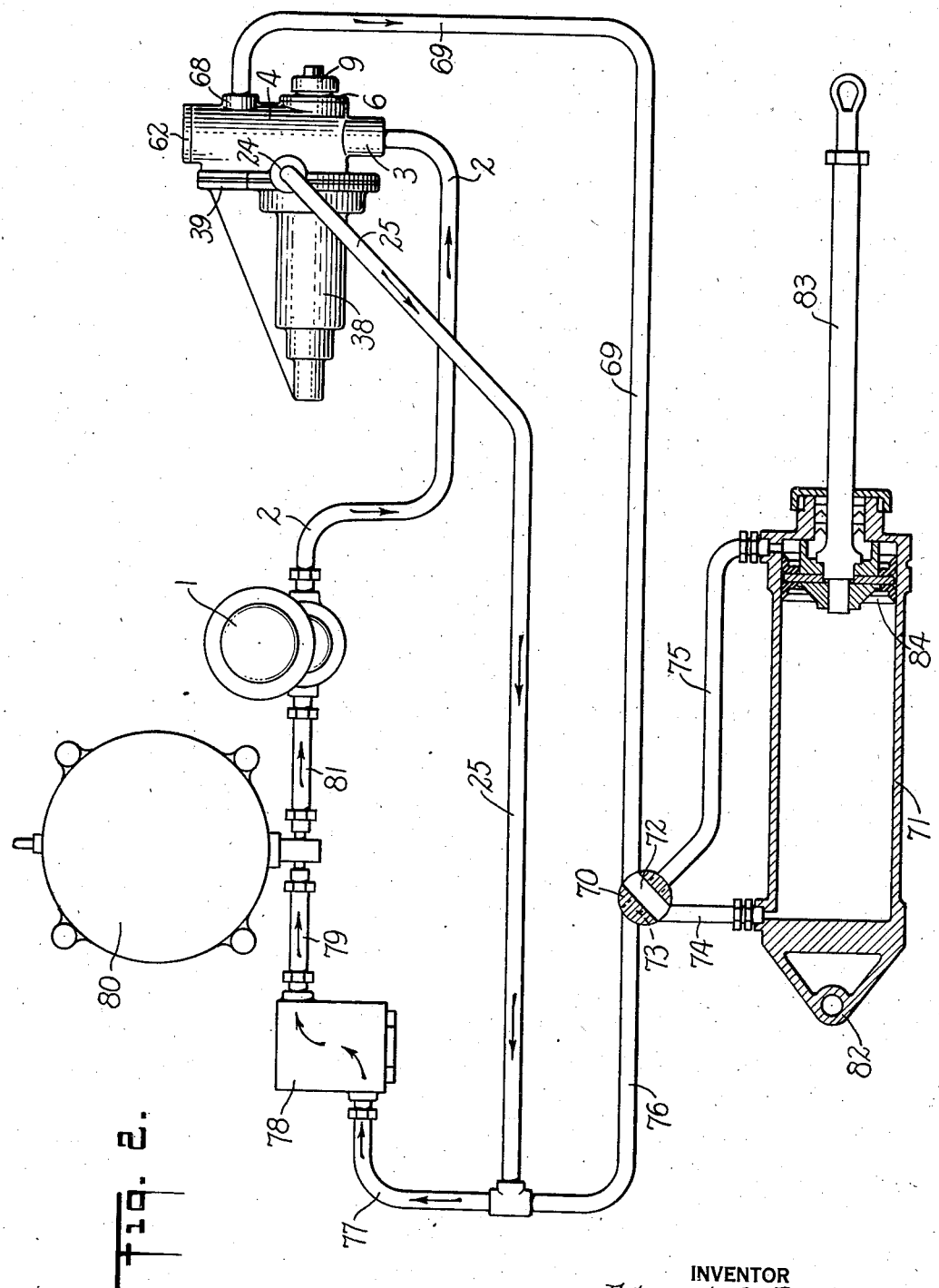

Patented Mar. 20, 1945

2,372,016

UNITED STATES PATENT OFFICE 2,372,016

UNLOADER VALVE

Edward A. Rockwell, Cleveland, Ohio

Application September 19, 1942, Serial No. 459,045

18 Claims. (Cl. 137—153)

My invention relates particularly to automatically operated valves but is applicable, for example, especially to the operation of unloader valves such for instance as such valves used in connection with pumps.

The object of my invention is to provide automatic valves adapted to operate with precision and certainty. A further object is to provide such valves having great rapidity of action. A further object is to provide valves of this character for unloading pumps. Another object is to provide such valves in hydraulic systems for operating the wheel-retracting under-carriages of airplanes. Further objects of my invention will appear from the detailed description of the same hereinafter. Furthermore, this apparatus is so constructed as to accumulate a spring pressure to operate a valve in both directions of operation and then provide a positive trigger action which releases the accumulated spring pressure to forcibly snap the valve off or on its seat.

While my invention is capable of being carried out in many different ways, for the purpose of illustration I have shown only one form of my invention in the accompanying drawings in which—

Fig. 1 is a vertical section of a unloader valve made in accordance with my invention; and Fig. 2 is a diagrammatic representation of a pump circuit in which the same is adapted to be used, as applied, for example, to the operation of an hydraulic jack, such for instance as the jack used in operating the retracting under-carriages for the wheels of an airplane.

In the drawings, I have shown a pump 1 of any desired character, but as, for example, a continuously operating gear pump which may be driven from the engine of an airplane in any desired way. The pump 1 is connected by a pipe 2 to an inlet port 3 of a valve casing 4 which may be supported on the airplane in any desired manner. The port 3 leads to a valve chamber 5 which is closed at one end by a screw ring 6 having an opening 7 which is sealed by an annular rubber seal 8 held in place by a screw plug 9 provided with a squared head 10. A screw ring 11 is carried over the outside of the screw ring 6 and the plug 9. In the interior of the plug 9 there is a fluted recess 12 for receiving an end 13, having a fluted end 14, of a release valve operating rod 15 for adjusting spring tensions. Supported around the plug 9 there is a helical spring 16, one end of which rests against the screw ring 6 and the other end of which extends into an annular release valve 17 where it rests against a shoulder 18 therein. The said release valve 17 has thereon a sleeve 19 having an annular rubber seal 20 arranged to slide within the screw ring 6. At the left hand end of said valve there is a conical valve element 21 which cooperates with an annular insertable valve seat 22 supported within a lateral passageway 23 in the valve casing 4. The sleeve 19 is an annular balanced valve member which has the effect of balancing the large valve 17 so that it can be opened by small operating forces. Accordingly, the light spring 16 can be used which is of only sufficient strength to return the valve 17 to its seat. The said passageway 23 leads to an exhaust port 24 which communicates with a return pipe 25. The said spring 16 normally keeps the conical valve member 21 on its seat 22 and parts are associated with the valve operating rod 15 for unseating the said valve member 21 when the pressure delivered by the unloader valve mechanism reaches a certain degree. For this purpose, on the valve operating rod 15 there are, tightly secured in recesses, annular stops or split rings 26 and 27. Adjacent to the split ring 26 there is a spring supporting sleeve 28 having a flange 29 to support a helical spring 30. The flange 29 rests against a split ring 31 located in a recess in a spring housing 32. The spring housing 32 has a restricted annular end 33 which is slidably carried upon the valve operating rod 15. On the outside of the spring housing 32 there is an annular flange 34 which acts as an interrupted surface cooperating with a series of balls 35 located around the housing 32 in recesses 35a and pressed towards the same by an annular helical spring 36 forming a complete uninterrupted circle within an annular recess 37 which is contained in an auxiliary valve casing 38 provided with a flange 39 for securing the same to the valve casing 4 by means of screws 40, a gasket 41 being provided to make a tight joint. In the recess 37 there is located a portion of the valve casing 4 forming a spring retaining ring 42 against which one end of a strong helical spring 43 rests, the said spring 43 being located in a transverse cylindrical chamber 44 in the auxiliary casing 38, said chamber 44 and passageway 23 being a discharge chamber. The other end of the helical spring 33 is supported by a disk 45 on the valve operating rod 15 on which it is held in place by a screw-threaded sleeve 46 having longitudinal grooves 47, in one of which a key pin 48, passing through the auxiliary casing 38, is adapted to slide to permit adjustment of the tension of the spring 43. This position of the disk 45 is made secure owing to the fact that it stops against the left face of the split ring 27. On the right-hand face of the split ring 27 there is a spring sleeve 49 having a flange 50 which rests against a split ring 51 in a recess within a spring housing 52. A helical spring 53 is located around the rod 15 between the spring sleeve 49 and the spring housing 52. The left-hand end 54 of the valve operating rod 15 is provided with a stop extension 53a and a number of annular oil recesses 55 for sealing the same and said end 54 is adapted to act as a piston so as to be moved by the oil pressure in a chamber 56 which communicates with a passageway 57 in said auxiliary casing 38 and which communicates with a passageway 58 in the valve casing 4. A tight connection is made between the passageways 57 and 58 by a tube 59 having around the same a rubber ring 60 located at the joint between the casings 4 and 38. The said passageway 58, at the right-hand end thereof, leads to a vertical chamber 61 in the casing 4, which is closed by a screw-plug 62 having a projection 63 thereon to act as a guide for a helical spring 64, the lower end of which rests upon the top of a check valve 65 cooperating with an annular valve seat 66 carried in said chamber 61. A port 67 connects the chamber 61 with the chamber 5. At the side of the chamber 61 there is an outlet port 68 which leads to a pipe 69 which may act as or be an accumulator for conveying the pressure liquid to a hand valve 70 for controlling the supply of the pressure liquid to the respective ends of a cylinder 71 of a jack, which may be used, for example, for controlling the extending and retracting gear of one or more of the wheels of an airplane. While any type of valve 70 might be used for this purpose, as shown diagrammatically, it is comprised of two crossed passageways 72 and 73, one of which is adapted to connect the pipe 69 to the cylinder 71 by a pipe 74 while the other passageway connects the other end of a cylinder 71 by a pipe 75 to a pipe 76 leading to the pipe 75 and thence by a pipe 77 to a filter 78 and a pipe 79 leading to a reservoir 80 and from the said reservoir 80 by a pipe 81 to the intake of the pump 1. In other words, the hand valve 70 is so arranged that when it supplies the pressure liquid to either end of the cylinder 71 the other end thereof may be connected to the return pipe to the reservoir, although it is to be understood that any other known type of valve mechanism can be used for the supply and discharge of the pressure liquid from the jack. It will of course be understood, also, that the cylinder 71 of the jack may have a bracket 82 for its attachment to the airplane and a piston rod 83, which is moved by a piston 84 for moving the particular wheel or wheels to which it may be attached.

In the operation of my invention, assuming that the airplane engine is being operated, the pump 1 will be driven accordingly and liquid therefrom is available to be supplied by the pipe 2 through the check valve 65 to the pipe 69 and thence to either end of the extending and retracting mechanism for the airplane wheels operated by the cylinder 71 of the jack provided for the same. It will of course be understood that there may be one such jack with its manual operating valve provided for operating each particular wheel of the airplane. When the pressure of the liquid which is thus supplied through the pipe 69 reaches any desired given maximum, this pressure, which is conveyed also through the passageway 57, will move the piston end 54 in opposition to the spring 43. This movement will continue until it reaches a position compressing the spring 53, until finally the lateral pressure exerted by the annular flange 34 on the balls 35 is sufficient to overcome the pressure exerted on the balls 35 by the annular helical spring 36, whereupon the flange 34 will be moved suddenly and quickly past the balls 35 to the right side of said balls. This will bring the end of the spring housing 32 against the valve 17 suddenly so as to open the same with a snap action, thus releasing the pressure liquid to be returned by the pipe 25 to the reservoir 80 and back to the pump 1 until such time as the pressure within the pipe 69 is lowered sufficiently to close the valve 17. However, as the pressure is lowered and before said valve 17 becomes closed, the valve operating rod 15 will move to the left while the spring 43 is expanding, resulting in compressing the spring 30 until such time that the force exerted by the flange 34 towards the left is sufficient to overcome the force of the annular helical spring 36, whereupon, under the influence of the spring 43, the flange 34 will suddenly move to the left side of the balls 35, thus closing the valve 17 suddenly and effectively with a snap action. Thus, the unloader valve mechanism will continue to operate in the manner described above to maintain the given pressure being supplied through the pipe 69 and in a most effective manner, inasmuch as the valve 17 will always be moved suddenly and definitely in a minimum time interval to immediately change any abnormal condition of pressure in the pipe 69, thus maintaining it substantially constant at all times.

While I have described my invention above in detail I wish it to be understood that many changes may be made therein without departing from the spirit of the same.

I claim:

1. A valve mechanism comprising a valve, a conduit having a delivery outlet for supplying a pressure fluid, connected to said valve, a discharge port for liquid controlled by said valve, a discharge chamber connected to said port, a part adapted to be moved by the pressure in said conduit, an element with an interrupted surface having a yielding connection to said part comprising means for urging the element in opposite directions located in said chamber, resilient means for forcing the part in one direction, a connection in substantially constant communication with said conduit for receiving liquid therefrom for forcing it constantly in the other direction, and a quick-action device connected to said element and including a movable member engaging said interrupted surface, having a spring adapted suddenly to open or close the connection of said valve to said discharge port from a given intermediate position of said element substantially immediately upon the movement of the element from the intermediate position in each of its directions of movement.

2. A valve mechanism comprising a valve, a conduit having a delivery outlet for supplying a pressure fluid, connected to said valve, a check valve in advance of said conduit and beyond said valve, a discharge port for liquid controlled by said valve, a discharge chamber connected to said port, a part adapted to be moved by the pressure in said conduit beyond the position of the check valve, an element with an interrupted surface having a yielding connection to said part comprising means for urging the element in opposite directions located in said chamber, resilient means for forcing the part in one direction, a connection to said conduit for forcing it in the other direction, and a quick-action device connected to said element and including a movable member engaging said interrupted surface, having a spring adapted to open or close the connection of said valve to said discharge port by the position of said element in each of its directions of movement.

3. In combination, a source of liquid pressure, a valve mechanism comprising a valve, a conduit leading from said source and having a delivery outlet for supplying a pressure fluid, connected to said valve, a discharge port for liquid leading back to said source, controlled by said valve, a discharge chamber connected to said port, a part adapted to be moved by the pressure in said conduit, an element with an interrupted surface having a yielding connection to said part comprising means for urging the element in opposite directions located in said chamber, resilient means for forcing the part in one direction, a connection in substantially constant communication with said conduit for receiving liquid therefrom for forcing it constantly in the other direction, and a quick-action device connected to said element and including a movable member engaging said interrupted surface, having a spring adapted to suddenly open or close the connection of said valve to said discharge port from a given intermediate position of said element substantially immediately upon the movement of the element from the intermediate position in each of its directions of movement.

4. In combination, a source of liquid pressure, a valve mechanism comprising a valve, a conduit leading from said source and having a delivery outlet for supplying a pressure fluid, connected to said valve, a check valve in advance of said conduit and beyond said valve, a discharge port for liquid leading back to said source, controlled by said valve, a discharge chamber connected to said port, a part adapted to be moved by the pressure in said conduit beyond the position of the check valve, an element with an interrupted surface having a yielding connection to said part comprising means for urging the element in opposite directions located in said chamber, resilient means for forcing the part in one direction, a connection to said conduit for forcing it in the other direction, and a quick-action device connected to said element and including a movable member engaging said interrupted surface, having a spring adapted to open or close the connection of said valve to said discharge port by the position of said element in each of its directions of movement.

5. A valve mechanism comprising a valve, a conduit having a delivery outlet for supplying a pressure fluid connected to said valve, a discharge port for liquid controlled by said valve, a discharge chamber connected to said port, a part adapted to be moved by the pressure in said conduit, an element with an interrupted surface having a yielding connection to said part comprising oppositely acting springs located in said chamber, resilient means for forcing the part in one direction, a connection to said conduit for forcing it in the other direction, and a quick-action device connected to said element and including a movable member engaging said interrupted surface, adapted to open or close the connection of said valve to said discharge port by the position of said element in each of its directions of movement.

6. A valve mechanism comprising a valve, a conduit having a delivery outlet for supplying a pressure fluid connected to said valve, a check valve in said conduit beyond said valve, a discharge port for liquid controlled by said valve, a discharge chamber connected to said port, a part adapted to be moved by the pressure in said conduit beyond the position of the check valve, an element with an interrupted surface having a yielding connection to said part comprising oppositely acting springs located in said chamber, resilient means for forcing the part in one direction, a connection to said conduit for forcing it in the other direction, and a quick-action device connected to said element and including a movable member engaging said interrupted surface, adapted to open or close the connection of said valve to said discharge port by the position of said element in each of its directions of movement.

7. A valve mechanism comprising a valve, a conduit having a delivery outlet for supplying a pressure fluid connected to said valve, a discharge port for liquid controlled by said valve, a discharge chamber connected to said port, a part adapted to be moved by the pressure in said conduit, an element with an interrupted surface having a yielding connection to said part comprising oppositely acting springs located in said chamber, said springs being supported on sleeve stops and enclosed by housings on one of which the interrupted surface is located, resilient means for forcing the part in one direction, a connection to said conduit for forcing it in the other direction, and a quick-action device connected to said element and including a movable member engaging said interrupted surface, adapted to open or close the connection of said valve to said discharge port by the position of said element in each of its directions of movement, a sleeve stop within each of said springs and a housing outside each of said springs, on one of which the interrupted surface is located.

8. A valve mechanism comprising a valve, a conduit having a delivery outlet for supplying a pressure fluid connected to said valve, a check valve in said conduit beyond said valve, a discharge port for liquid controlled by said valve, a discharge chamber connected to said port, a part adapted to be moved by the pressure in said conduit beyond the position of the check valve, an element with an interrupted surface having a yielding connection to said part comprising oppositely acting springs located in said chamber, said springs being supported on sleeve stops and enclosed by housings on one of which the interrupted surface is located, resilient means for forcing the part in one direction, a connection to said conduit for forcing it in the other direction, and a quick-action device connected to said element and including a movable member engaging said interrupted surface, adapted to open or close the connection of said valve to said discharge port by the position of said element in each of its directions of movement.

9. A valve mechanism comprising a valve, a conduit having a delivery outlet for supplying a pressure fluid connected to said valve, a discharge port for liquid controlled by said valve, a discharge chamber connected to said port, a plunger adapted to be moved by the pressure in said conduit, an element on said plunger provided with an interrupted surface having a yielding connection to said plunger comprising oppositely acting coil springs around the plunger located in said chamber, a coil spring for forcing the plunger in one direction, a connection to said conduit for forcing it in the other direction, and a quick-action device connected to said element and including a movable member engaging said interrupted surface, adapted to open or close the connection of said valve to said discharge port by the position of said element in each of its directions of movement.

10. A valve mechanism comprising a valve, a conduit having a delivery outlet for supplying a pressure fluid connected to said valve, a check valve in advance of said conduit and beyond said valve, a discharge port for liquid controlled by said valve, a discharge chamber connected to said port, a plunger adapted to be moved by the pressure in said conduit beyond the position of the check valve, an element on said plunger provided with an interrupted surface having a yielding connection to said plunger comprising oppositely acting coil springs around the plunger located in said chamber, a coil spring for forcing the plunger in one direction, a connection to said conduit for forcing it in the other direction, and a quick-action device connected to said element and including a movable member engaging said interrupted surface, adapted to open or close the connection of said valve to said discharge port by the position of said element in each of its directions of movement.

11. A valve mechanism comprising a valve, a conduit having a delivery outlet for supplying a pressure fluid connected to said valve, a discharge port for liquid controlled by said valve, a discharge chamber connected to said port, a plunger adapted to be moved by the pressure in said conduit, an element on said plunger provided with an interrupted surface having a yielding connection to said plunger comprising oppositely acting coil springs around the plunger located in said chamber, said springs being supported on stop sleeves, a coil spring for forcing the plunger in one direction, a connection to said conduit for forcing it in the other direction, and a quick-action device connected to said element and including a movable member engaging said interrupted surface, adapted to open or close the connection of said valve to said discharge port by the position of said element in each of its directions of movement.

12. A valve mechanism comprising a valve, a conduit having a delivery outlet for supplying a pressure fluid connected to said valve, a check valve in said conduit beyond said valve, a discharge port for liquid controlled by said valve, a discharge chamber connected to said port, a plunger adapted to be moved by the pressure in said conduit beyond the position of the check valve, an element on said plunger provided with an interrupted surface having a yielding connection to said plunger comprising oppositely acting coil springs around the plunger located in said chamber, said springs being supported on stop sleeves, a coil spring for forcing the plunger in one direction, a connection to said conduit for forcing it in the other direction, and a quick-action device connected to said element and including a movable member engaging said interrupted surface, adapted to open or close the connection of said valve to said discharge port by the position of said element in each of its directions of movement.

13. A valve mechanism comprising a valve, a conduit having a delivery outlet for supplying a pressure fluid connected to said valve, a discharge port for liquid controlled by said valve, a discharge chamber connected to said port, a part adapted to be moved by the pressure in said conduit, an element with an interrupted surface having a yielding connection to said part comprising springs for urging the element in opposite directions located in said chamber, resilient means for forcing the part in one direction, a connection to said conduit for forcing it in the other direction, and a quick-action device connected to said element and including a circular set of balls, pressed inwardly by an annular helical spring, for engaging said interrupted surface, adapted to open or close the connection of said valve to said discharge port by the position of said element in each of its directions of movement.

14. A valve mechanism comprising a valve, a conduit having a delivery outlet for supplying a pressure fluid connected to said valve, a check valve in said conduit beyond said valve, a discharge port for liquid controlled by said valve, a discharge chamber connected to said port, a part adapted to be moved by the pressure in said conduit beyond the position of the check valve, an element with an interrupted surface having a yielding connection to said part comprising springs for urging the element in opposite directions located in said chamber, resilient means for forcing the part in one direction, a connection to said conduit for forcing it in the other direction, and a quick-action device connected to said element and including a circular set of balls pressed inwardly by an annular helical spring, for engaging said interrupted surface, adapted to open or close the connection of said valve to said discharge port by the position of said element in each of its directions of movement.

15. A valve mechanism comprising a valve, a conduit having a delivery outlet for supplying a pressure fluid connected to said valve, a discharge port for liquid controlled by said valve, a discharge chamber connected to said port, a part adapted to be moved by the pressure in said conduit, an element with an interrupted surface having a yielding connection to said part comprising means for urging the element in opposite directions located in said chamber, resilient means for forcing the part in one direction, a connection to said conduit for forcing it in the other direction, a quick-action device connected to said element, including a circular set of balls, for engaging said interrupted surface, adapted to open or close the connection of said valve to said discharge port by the position of said element in each of its directions of movement, a casing in which the valve is located, and an auxiliary casing secured thereto containing said quick-action device, between which casings the circular set of balls is located.

16. A valve mechanism comprising a valve, a conduit having a delivery outlet for supplying a pressure fluid connected to said valve, a check valve in said conduit beyond said valve, a discharge port for liquid controlled by said valve, a discharge chamber connected to said port, a part adapted to be moved by the pressure in said conduit beyond the position of the check valve, an element with an interrupted surface having a yielding connection to said part comprising means for urging the element in opposite directions located in said chamber, resilient means for forcing the part in one direction, a connection to said conduit for forcing it in the other direction, a quick-action device connected to said element, including a circular set of balls, for engaging said interrupted surface, adapted to open or close the connection of said valve to said discharge port by the position of said element in each of its directions of movement, a casing in which the valve is located, and an auxiliary casing secured thereto containing said quick-action device, between which casings the circular set of balls is located.

17. A valve mechanism comprising a valve, a conduit having a delivery outlet for supplying a pressure fluid, connected to said valve, a discharge port for liquid controlled by said valve, a discharge chamber connected to said port, an element having an operative connection to said valve, a detent restraining the movement of the element, a spring urging the detent into engagement with the element and yielding spring pressure accumulating means located in said chamber having an operative connection to said element adapted to urge the element to pass across the restraining position of the detent suddenly to move said element in each of two opposite directions by the accumulated spring pressure according to the relative position of said element and yielding means, said yielding means having a connection to said pressure fluid conduit for forcing the element in one direction.

18. A valve mechanism comprising a valve, a conduit having a delivery outlet for supplying a pressure fluid, connected to said valve, a discharge port for liquid controlled by said valve, a discharge chamber connected to said port, an element having an operative connection to said valve, a detent restraining the movement of the element, a spring urging the detent into engagement with the element and yielding spring pressure accumulating means located in said chamber having an operative connection to said element adapted to urge the element to pass across the restraining position of the detent suddenly to move said element in each of two opposite directions by the accumulated spring pressure according to the relative position of said element and yielding means, said yielding means having a connection to said pressure fluid conduit for forcing the element in one direction and a spring for forcing said element in the other direction.

EDWARD A. ROCKWELL.